(12) United States Patent
Osawa

(10) Patent No.: US 11,533,002 B2
(45) Date of Patent: Dec. 20, 2022

(54) VIBRATION TYPE MOTOR, OPTICAL APPARATUS, AND DRIVING APPARATUS USING DAMPER TO SUPPRESS NOISE

(71) Applicant: CANON KABUSHIKI KAISHA, Tokyo (JP)

(72) Inventor: Kazuharu Osawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 16/909,087

(22) Filed: Jun. 23, 2020

(65) Prior Publication Data

US 2020/0403533 A1  Dec. 24, 2020

(30) Foreign Application Priority Data

Jun. 24, 2019  (JP) .............................. JP2019-116405

(51) Int. Cl.
*H02N 2/00* (2006.01)
*B06B 1/06* (2006.01)

(52) U.S. Cl.
CPC ......... *H02N 2/0055* (2013.01); *B06B 1/0648* (2013.01); *H02N 2/004* (2013.01)

(58) Field of Classification Search
CPC ...... H02N 2/0055; H02N 2/004; H02N 2/026; H02N 2/0015; B06B 1/0648; G02B 7/08
See application file for complete search history.

(56) References Cited

U.S. PATENT DOCUMENTS

| | | | |
|---|---|---|---|
| 9,000,654 B2 | 4/2015 | Yamasaki et al. | |
| 2015/0137663 A1* | 5/2015 | Kimura | H02N 2/0055 |
| | | | 310/323.02 |
| 2017/0038554 A1* | 2/2017 | Nakashita | G03B 3/10 |
| 2018/0097459 A1 | 4/2018 | Osawa | |
| 2019/0341863 A1 | 11/2019 | Ninomiya et al. | |
| 2019/0363647 A1 | 11/2019 | Takai et al. | |
| 2019/0393807 A1 | 12/2019 | Oikawa et al. | |

FOREIGN PATENT DOCUMENTS

JP  2013-158151 A  8/2013

OTHER PUBLICATIONS

U.S. Appl. No. 16/910,773, Kazuharu Osawa, filed Jun. 24, 2020.

* cited by examiner

*Primary Examiner* — Emily P Pham
(74) *Attorney, Agent, or Firm* — Venable LLP

(57) ABSTRACT

A vibration type motor relatively moves, in a first direction, a vibrator whose vibration is excited by an electromechanical energy conversion element and a contact member configured to contact the vibrator, and includes a vibrator holder configured to hold the vibrator, a holding mechanism configured to hold the vibrator holder so as to restrict a displacement of the vibrator holder in the first direction and to enable the vibrator holder to be displaced in a direction orthogonal to the first direction, a press mechanism configured to press the vibrator against the contact member in a second direction, and a damper configured to contact a plurality of components among the vibrator holder, components of the holding mechanism, and components of the press mechanism.

12 Claims, 8 Drawing Sheets

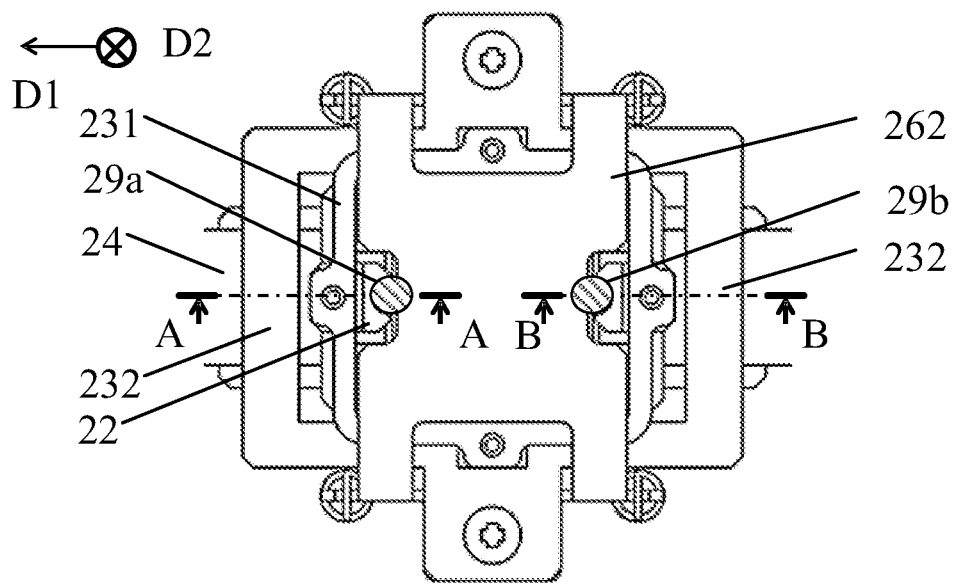
FIG. 7A
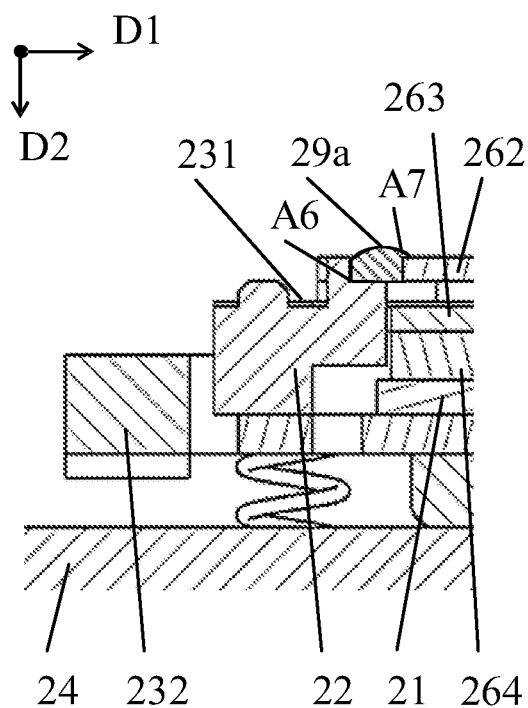 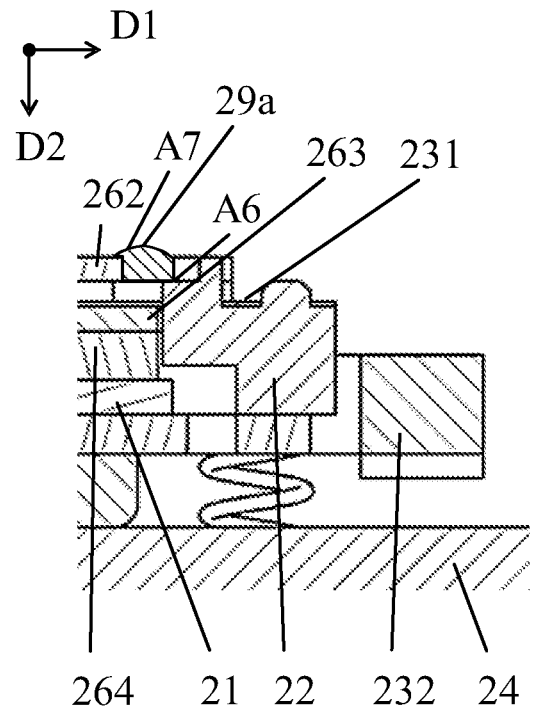
FIG. 7B                FIG. 7C

VIBRATION TYPE MOTOR, OPTICAL APPARATUS, AND DRIVING APPARATUS USING DAMPER TO SUPPRESS NOISE

BACKGROUND OF THE INVENTION

Field of the Invention

The present invention relates to a vibration type motor used to drive a lens in an optical apparatus, etc.

Description of the Related Art

The vibration type motor generates a driving force by relatively moving a vibrator whose vibration is excited by an electromechanical energy conversion element, and a contact member that compressively contacts the vibrator. A vibration type motor disclosed in Japanese Patent Laid-Open No. ("JP") 2013-158151 is configured so that a vibrator and a vibrator holder holding it are restrained by a body that holds them such that they are not displaced in a driving direction, and they are displaceable in a pressing direction against the contact member. The pressing force for pressing the vibrator against the contact member is configured to directly act on the vibrator without intervention of the vibrator holder.

However, the vibration type motor disclosed in JP 2013-158151 does not restrain the vibrator holder in the pressing direction, and thus a two-body motion between the vibrator and the vibrator holder is likely to generate the resonance when the vibrator generates the vibration. This resonance causes noises.

SUMMARY OF THE INVENTION

The present invention provides a vibration type motor, an optical apparatus, and a driving apparatus, each of which can suppress noises.

A vibration type motor according to one aspect of the present invention relatively moves in a first direction a vibrator whose vibration is excited by an electromechanical energy conversion element and a contact member configured to contact the vibrator and includes a vibrator holder configured to hold the vibrator, a holding mechanism configured to hold the vibrator holder so as to restrict a displacement of the vibrator holder in the first direction and to enable the vibrator holder to be displaced in a direction orthogonal to the first direction, a press mechanism configured to press the vibrator against the contact member in the second direction, and a damper configured to contact a plurality of components among the vibrator holder, components of the holding mechanism, and components of the press mechanism.

An optical apparatus and a driving apparatus having the above vibration type motor also constitute another aspect of the present invention.

Further features of the present invention will become apparent from the following description of exemplary embodiments with reference to the attached drawings.

BRIEF DESCRIPTION OF THE DRAWINGS

FIGS. 7A to 7C illustrate a characteristic structure of the vibration type motor according to the second embodiment.

DESCRIPTION OF THE EMBODIMENTS

Referring now to the accompanying drawings, a description will be given of embodiments according to the present invention.

First Embodiment

Figures 1A, 1B:
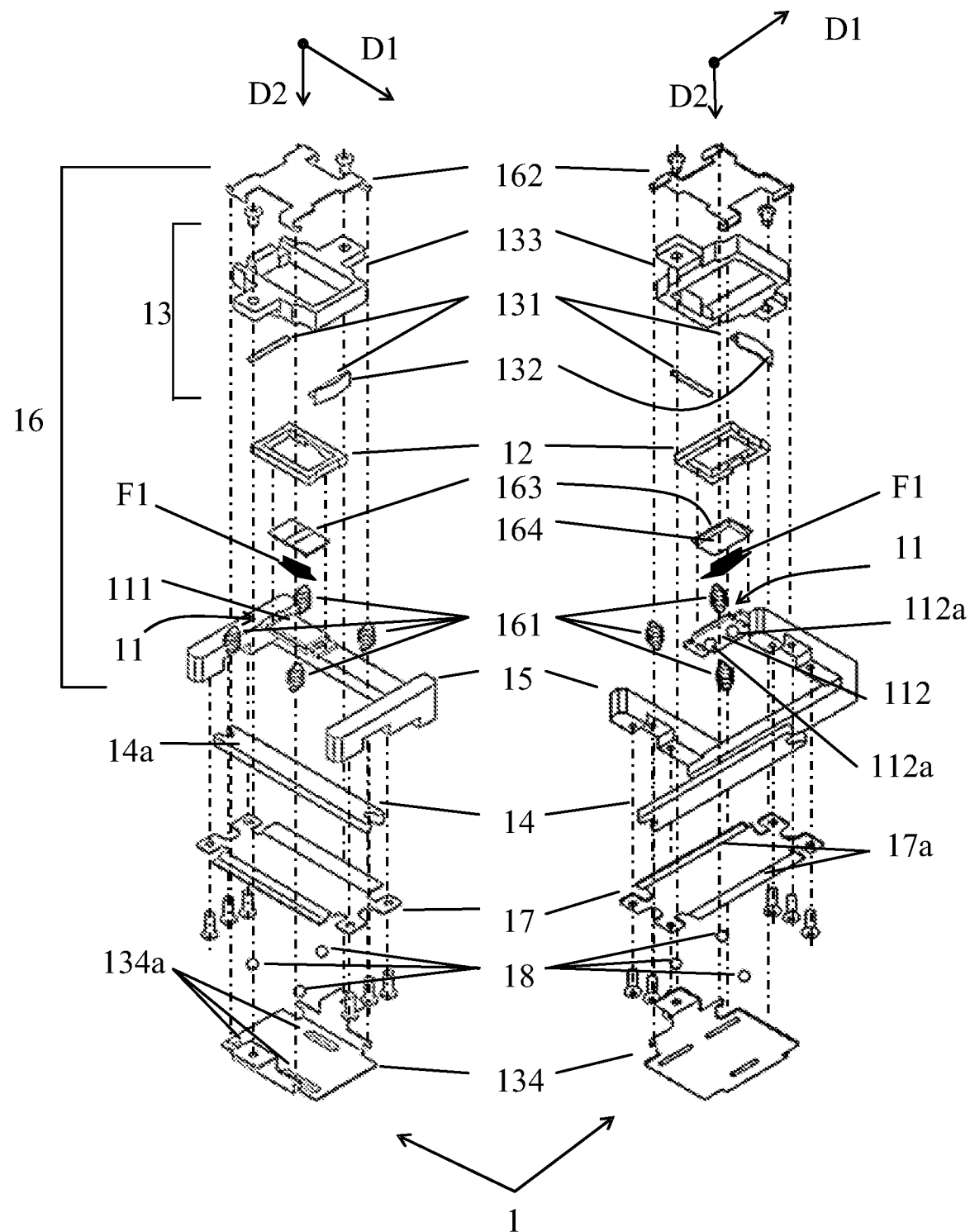
FIGS. 1A and 1B are exploded perspective views of a vibration type motor according to a first embodiment of the present invention.

FIGS. 1A and 1B illustrate exploded views of a vibration type motor 1 according to a first embodiment of the present invention. FIG. 1A illustrates the vibration type motor 1 viewed from diagonally above, and FIG. 1B illustrates the vibration type motor 1 viewed from diagonally below. In FIGS. 1A and 1B, D1 denotes a driving direction which is a relative movement direction between a vibrator and a contact member, which will be described later, in the vibration type motor 1, and D2 denotes a pressing direction in which the press mechanism (described later) presses the vibrator against the contact member by a pressing force F1. In the following description, the driving direction D1 includes not only one direction indicated by an arrow in the drawing but also the opposite direction. Displacing or vibrating in the pressing direction D2 means displacing or vibrating in a direction opposite to the pressing direction D2.

The vibration type motor 1 includes a vibrator 11, a vibrator holder 12, a holding mechanism 13, a friction member 14 as a contact member, a base member 15, and a press mechanism 16.

The vibrator 11 is formed by adhering to each other a piezoelectric element 111 as an electromechanical energy conversion element and an elastic member 112 having two protrusions 112a. The piezoelectric element 111 is made of, for example, PZT (lead zirconate titanate), and the elastic member 112 is made, for example, of a metal plate. When a periodic voltage is applied to the piezoelectric element 111, the piezoelectric element 111 expands and contracts, and the elastic member 112 is excited by the expansion and contraction. This vibration causes an elliptical motion at the tip of the projection 112a.

The vibrator holder 12 is a frame formed, for example, of a resin, and holds the vibrator 11 fixed by bonding.

The holding mechanism 13 includes two roll members 131, a play (or backlash) removing spring 132, a movable frame 133, and a movable guide member 134. Each roll member 131 includes, for example, a metal roller, and the play removing spring 132 includes, for example, a leaf spring. The movable frame 133 is a frame made, for example, of a resin, and the movable guide member 134 includes a sheet metal member having three guide grooves 134a extending in the driving direction D1. The movable frame 133 and the movable guide member 134 are fixed to each other by screws. The movable guide member 134 is movably guided in the driving direction D1 by a fixed guide member 17 and a roll ball 18, which will be described later.

Figure 2A:
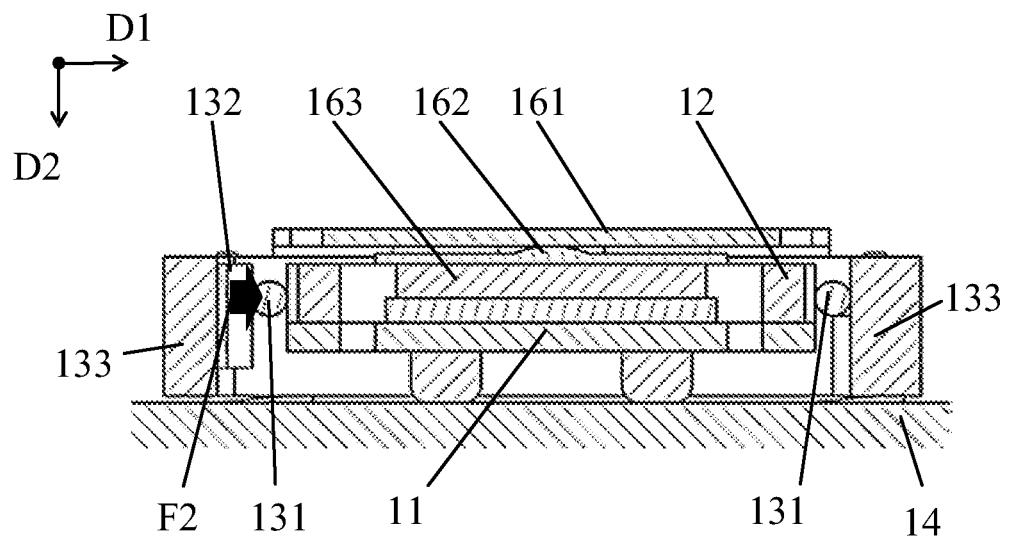
FIGS. 2A and 2B illustrate a structure of the vibration type motor according to the first embodiment.
Figure 2B:
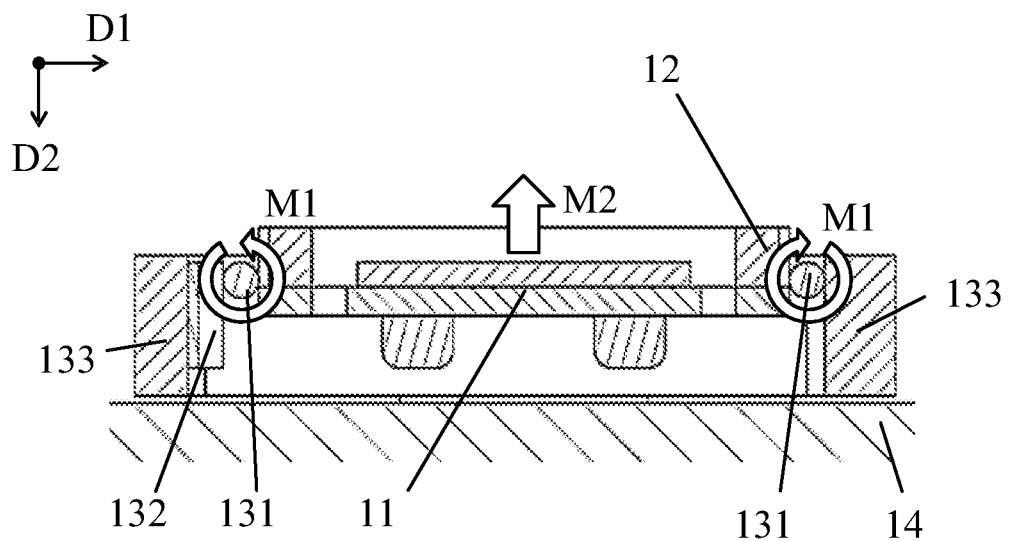

Referring now to FIGS. 2A and 2B, a detailed description will be given of the holding mechanism 13. FIGS. 2A and 2B illustrate sections parallel to the driving direction D1 and the pressing direction D2 of the vibration type motor 1. FIG. 2A illustrates the vibrator 11 pressed against the friction member 14, and FIG. 2B illustrates a state before the vibrator 11 is pressed against the friction member 14.

The vibrator holder 12 is sandwiched between two roll members 131 in the driving direction D1. The play removing spring 132 forces the one roll member 131, the vibrator holder 12, and the other roll member 131 to the one side against the movable frame 133 by the biasing force F2. Thereby, the vibrator 11 and the vibrator holder 12 are integrally restricted by the movable frame 133 so that there is no play in the driving direction D1 (so as to prevent their displacements) and they are displaceable in the pressing direction D2.

As illustrated in FIG. 2B, when the vibrator 11 is not pressed against the friction member 14, the roll member 131 rolls in the arrow direction Ml, so that the vibrator 11 and the vibrator holder 12 can displace in the pressing direction D2 orthogonal to the driving direction D1. That is, the vibrator 11 and the vibrator holder 12 are held by the movable frame 133 so as to be integrally displaceable in the pressing direction D2.

Use of the holding mechanism 13 enables the driving force generated by the vibrator 11 to be transmitted to the vibrator 11 without any play in the driving direction D1 and without obstructing the pressing force F1. Thereby, the contact state is stabilized between the vibrator 11 and the friction member 14, and a good driving characteristic of the vibration type motor 1 can be obtained.

The friction member 14 is made, for example, of a metal plate, and compressively contacts the protrusions 112a of the vibrator 11 on the sliding surface 14a. The base member 15 is a housing made, for example, of a resin. The friction member 14 and the fixed guide member 17 are fixed onto the base member 15 by screws. The fixed guide member 17 is formed, for example, as a sheet metal member, and has two guide grooves 17a extending in the driving direction D1. Three roll balls 18 are sandwiched between the three guide grooves 134a in the movable guide member 134 and the two guide grooves 17a in the fixed guide member 17. With this structure, the movable guide member 134 is movably guided relative to the fixed guide member 17 in the drive direction D1.

The press mechanism 16 includes four pressing force generators 161, a first press plate 162, a second press plate 163, and a buffer member 164. The pressing force generators 161 include, for example, four tension springs, and the first press plate 162 and the second press plate 163 are formed, for example, as sheet metal members. The buffer member 164 is made of, for example, felt, and attached to a surface of the second press plate 163 on the vibrator 11 (piezoelectric element 111) side. In an extension state, the tension spring serving as the pressing force generator 161 has one end connected to the movable guide member 134 and the other end connected to the first press plate 162, and generates the pressing force F1 in the contraction direction. The pressing force F1 generated by the pressing force generator 161 acts on the vibrator 11 via the first press plate 162, the second press plate 163, and the buffer member 164. Since the vibrator 11 is held so as to be displaceable in the pressing direction D2 as described above, the projection 112a of the vibrator 11 that has received the pressing force F1 compressively contacts the sliding surface 14a of the friction member 14. At this time, the pressing force F1 acts directly on the vibrator 11 without intervention of the vibrator holder 12. This is because, when the vibrator 11 is pressurized via the vibrator holder 12, the pressing force F1 acts on the bonded portion between the vibrator holder 12 and the vibrator 11, and the bonded portion may be peeled off or fall off.

When the elliptical motion occurs in the protrusion 112a as described above in the thus-configured vibration type motor 1, a driving force is generated between the protrusion 112a and the sliding surface 14a of the friction member 14. Thereby, the vibrator 11, the vibrator holder 12, the holding mechanism 13, and the press mechanism 16 can be driven in the driving direction D1 relative to the friction member 14 and the base member 15.

Figure 3A:
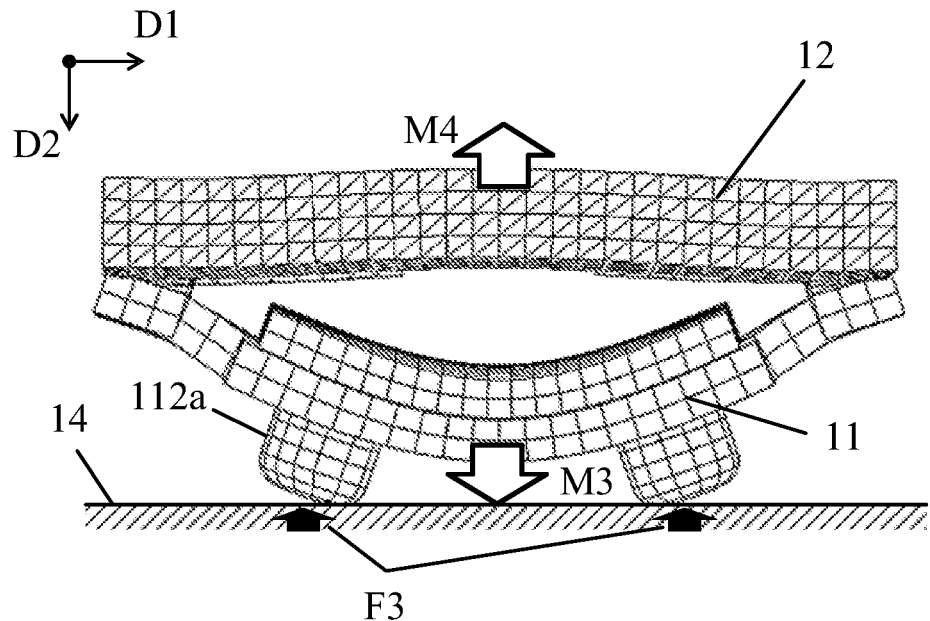
FIGS. 3A and 3B explain a noise generating mechanism in the conventional vibration motor.
Figure 3B:
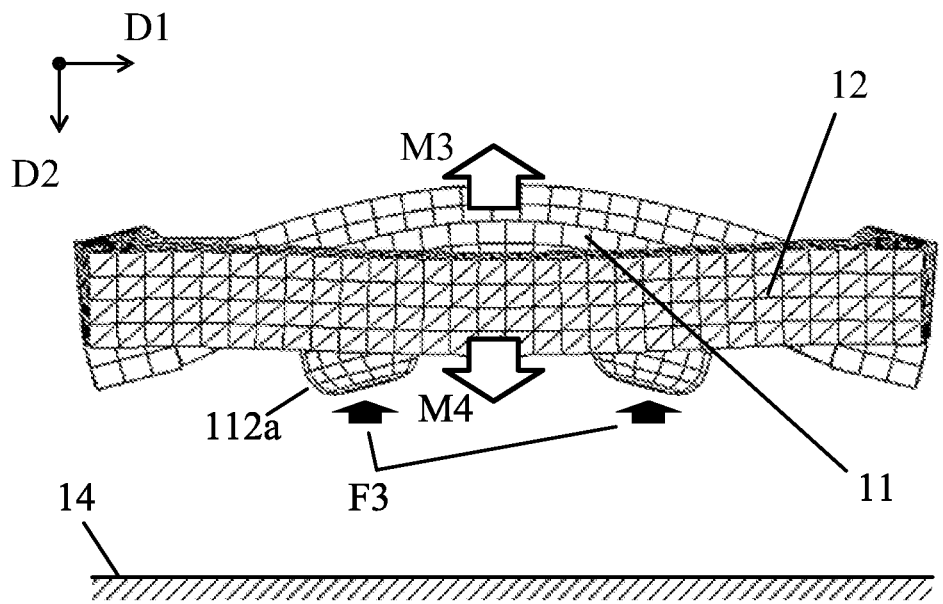

Referring now to FIGS. 3A and 3B, a description will be given of noises generated from the vibration motor. FIGS. 3A and 3B illustrate deformations at different timings in the peculiar resonance mode generated in the vibrator 11 and the vibrator holder 12. In the peculiar resonance mode, the deformation illustrated in FIG. 3A and the deformation illustrated in FIG. 3B are alternately repeated. In the figure, M3 represents a displacement of the vibrator 11, M4 represents a displacement of the vibrator holder 12, and a displacement amount is exaggerated.

When the vibration is excited in the vibrator 11, the elliptical motion is generated at the tip of the projection 112a, and the projection 112a repeats the contact and separation with the friction member 14 illustrated in FIGS. 1A and 1B. When the vibration excited in the vibrator 11 increases, the elliptical motion of the protrusion 112a increases, and an impact force F3 generated by the contact between the protrusion 112a and the friction member 14 increases. Since the vibrator 11 and the vibrator holder 12 are held so as to be displaceable in the pressing direction D2 only by holding by the holding mechanism 13 illustrated in FIGS. 1A and 1B, the resonance in which the vibrator 11 and the vibrator holder 12 are likely to displace is in the pressing direction D2 while the impact force F3 is a vibration source.

The vibrator 11 is fixed onto the vibrator holder 12, and they have masses close to each other. Thus, as illustrated by M3 and M4 in the drawing, a two-body motion occurs in which the centers of gravity of the vibrator 11 and the vibrator holder 12 are deformed in opposite directions in the pressing direction D2 by the impact force F3.

Then, the vibrator 11 compressively contacts the friction member 14 due to the pressing force F1 so that the vibration is likely to be suppressed, while the pressing force F1 is not applied to the vibrator holder 12, and it is not restrained from vibrating and vibrates with a large displacement in the pressing direction D2. Thus, in particular, the vibrator holder 12 and the roll member 131 that directly contacts the vibrator holder 12 vibrate in the pressing direction D2, and this vibration may cause noises. In particular, when the resonance frequency is equal to or lower than 20 kHz, noises in the audible range are likely to occur.

Figure 4A:
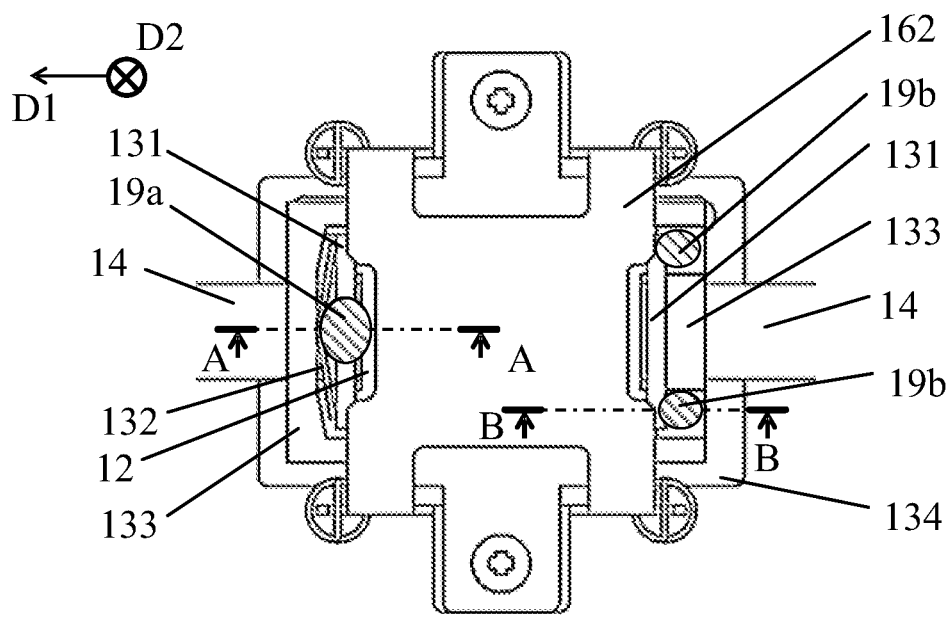
FIGS. 4A to 4C illustrate a characteristic structure of the vibration type motor according to the first embodiment.
Figure 4B:
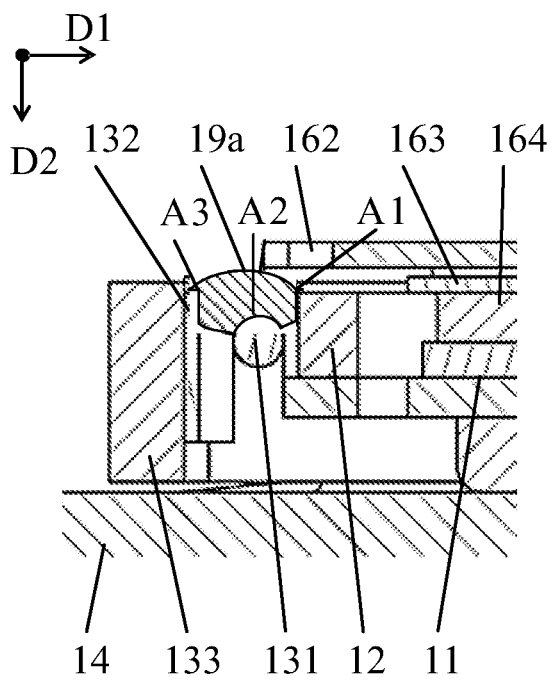

In order to restrain the noises, the vibration type motor 1 according to this embodiment includes the dampers 19a and 19b as elastic members that contact a component that moves in the driving direction D1 together with the vibrator 11 and is relatively displaceable in the pressing direction D2, as illustrated in FIGS. 4A and 4B. The component that moves in the driving direction D1 together with the vibrator 11 and is relatively displaceable in the pressing direction D2 includes the vibrator holder 12, a roll member 131, the play removing spring 132, the movable frame 133, and the movable guide member 134 that are components in the holding mechanism 13, and the pressing force generator 161, the first press plate 162, the second press plate 163, and the buffer member 164 that are components of the press mechanism 16. This embodiment provides the dampers 19*a* and 19*b* such that the dampers 19*a* and 19*b* contact a plurality of components among them, respectively.

Figure 4C:
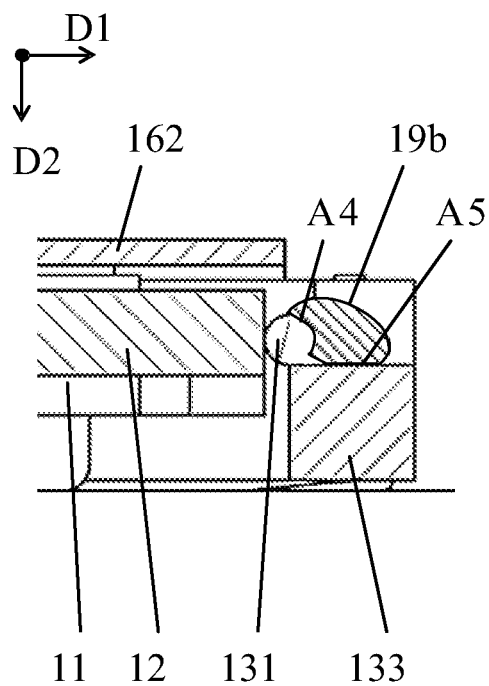

FIG. 4A illustrates the vibrator 11, the vibrator holder 12, the holding mechanism 13, the friction member 14, the press mechanism 16, and the dampers 19*a* and 19*b* viewed from the top, and FIGS. 4B and 4C illustrate A-A and B-B sections in FIG. 4A.

The dampers 19*a* and 19*b* are made, for example, of an elastic adhesive or a damping rubber. The damper 19*a* is disposed across the vibrator holder 12, the roll member 131, and the play removing spring 132, and contacts them at contact areas A1, A2, and A3. The damper 19*b* is disposed across the roll member 131 and the movable frame 133, and contacts them at contact areas A4 and A5.

As illustrated in FIG. 2B, when the roll member 131 rolls, the roll member 131, the vibrator holder 12, and the play removing spring 132 are displaced relative to each other in the pressing direction D2. The roll member 131 and the movable frame 133 are also relatively displaced in the pressing direction D2. When these members are relatively displaced in the pressing direction D2, the dampers 19*a* and 19*b* deflect and attenuate the displacements.

Thus, in the vibration type motor 1 according to this embodiment, the holding mechanism 13 holds the vibrator 11 via the vibrator holder 12, and the press mechanism 16 presses the vibrator 11 against the contact member 14 without intervention of the vibrator holder 12. The holding mechanism 13 restrains the vibrator 11 and the vibrator holder 12 integrally in the driving direction D1 and enables them to be displaced in the pressing direction D1. The dampers 19*a* and 19*b* contact a plurality of components (such as the vibrator holder 12, the roll member 131, the play removing spring 132, and the movable frame 133 that can be displaced in the pressing direction D2 relative to the vibrator holder 12) that move in the driving direction D1 together with the vibrator 11 and are relatively displaceable in the pressing direction D2, thereby attenuating the vibrations of the vibrator holder 12 and the components constituting the holding mechanism 13 for holding the vibrator holder 12 in the pressing direction D2.

Moreover, in the vibration type motor 1 according to this embodiment, the damper 19*a* contacts the vibrator holder 12, the roll member 131 that can directly contact the vibrator holder 12 and be displaced in the pressing direction D2, and the play removing spring 132 that can be relatively displaced in the pressing direction D2. The damper 19*b* contacts the roll member 131 that directly contacts the vibrator holder 12, the play removing spring 132 and movable frame 133 that can be displaced in the pressing direction D2 relative to the roll member 131. When the resonance occurs between the vibrator 11 and the vibrator holder 12, the vibrator holder 12 and the roll member 131 that directly contacts the vibrator holder 12 are particularly likely to significantly vibrate and cause noises. Hence, both the dampers 19*a* and 19*b* contact the vibrator holder 12 and the roll members 131.

Figure 5A:
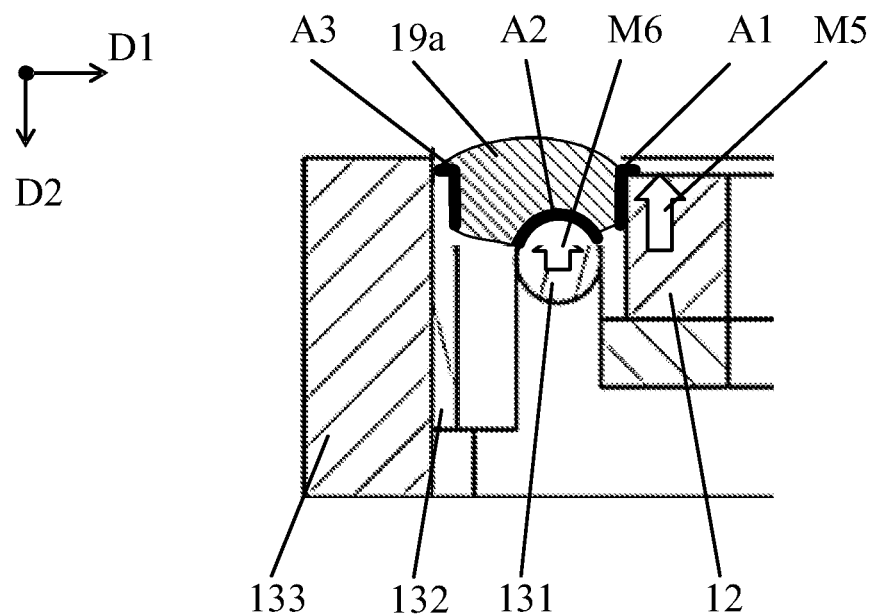
FIGS. 5A and 5B illustrate an effect of the vibration type motor according to the first embodiment.
Figure 5B:
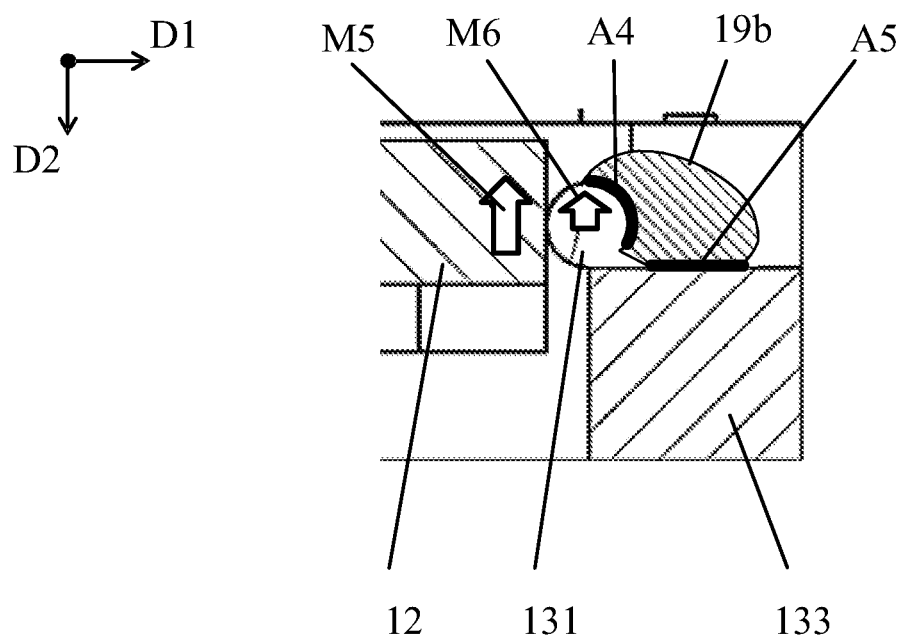

FIGS. 5A and 5B are enlarged views of the peripheries of the dampers 19*a* and 19*b* illustrated in FIGS. 4B and 4C, respectively. As described with reference to FIGS. 3A and 3B, in the vibration type motor 1 in which the dampers 19*a* and 19*b* are not provided, the resonance is likely to occur between the vibrator 11 and the vibrator holder 12. In particular, the vibrator holder 12 to which the pressing force F1 is not applied vibrates in the pressing direction D2, and the surrounding members may vibrate in the pressing direction D2 and generate the noises.

Since the dampers 19*a* and 19*b* can attenuate the vibration energy as they bend significantly, the dampers 19*a* and 19*b* may be located at a position where each damper significantly deflects due to the displacement of the vibration. When the vibrator holder 12 is displaced in the pressing direction D2 as indicated by M5 in FIG. 5A, the roll member 131 is displaced in the pressing direction D2 as indicated by M6, but the movable frame 133 is not displaced. At this time, a displacement difference occurs among the contact areas A1, A2, and A3 in the damper 19*a*, and the damper 19*a* significantly bends. Thereby, the vibrations of the vibrator holder 12 and the roll member 131 in the pressing direction D2 can be attenuated. When the vibrator holder 12 is displaced in the pressing direction D2 as illustrated by M5 in FIG. 5B, a displacement difference occurs between the contact areas A4 and A5 and the damper 19*b* significantly bends. Thereby, the vibration of the roll member 131 in the pressing direction D2 can be attenuated.

The dampers 19*a* and 19*b* are less rigid than the components of the holding mechanism 13 and suppress the vibration in frequencies for generating noises, but bend without attenuating steady or extremely low frequencies like the pressing force F1 and thus hardly disturb the displacement caused by the pressing force F1. Therefore, the pressing force F1 acts on the vibrator 11 to stably bring the vibrator 11 into contact with the friction member 14. Although the dampers 19*a* and 19*b* slightly hinder the pressing force F1, the reaction forces generated when the dampers 19*a* and 19*b* bend may be as small as possible. More specifically, the dampers 19*a* and 19*b* may bend as easily as possible in the pressing direction D2, and the bending (or flexure) amounts of the dampers 19*a* and 19*b* may be as small as possible when the vibrator 11 is pressed against the friction member 14.

The above structure can suppress the vibrations in the pressing direction D2 of the vibrator holder 12 and the roll members 131 that contact the vibrator holder 12, thereby suppressing the noises caused by the vibrations. Particularly, when the resonance frequency between the vibrator 11 and the vibrator holder 12 is in the audible range of 20 kHz or less since the mass of the vibrator holder 12 is close to the mass of the vibrator 11, etc., the noises caused by the resonance can be effectively suppressed.

Generally, the elastic materials are more likely to bend in the bending direction than in the compression direction. Therefore, as understood from FIGS. 5A and 5B, the contact areas A1, A2, and A3 of the damper 19*a* with the other components (12, 131, 132) may be arranged so as not to overlap each other when viewed from the pressing direction D2 and the contact areas A4 and A5 of the damper 19*b* with the other components (131, 133) may be arranged so as not to overlap each other, because the dampers 19*a* and 19*b* are bent in the bending direction and the pressing force F1 is less likely to be hindered. When the contact areas A1, A2, and A3 overlap each other or the contact areas A4 and A5 overlap each other when viewed from the pressing direction D2, the dampers 19*a* and 19*b* bend in the compression direction, the reaction force increases, and the pressing force F1 is likely to be hindered. As long as the contact areas A1, A2, and A3 have parts that do not overlap each other when viewed from the pressing direction D2, and the contact areas A4 and A5 have parts that do not overlap each other, the reaction force can be reduced even though they partially overlap each other.

The factors that cause the dampers 19*a* and 19*b* to bend when the vibrator 11 is pressed against the friction member 14 include tolerances of parts of the vibrator 11, the vibrator holder 12, the holding mechanism 13, and the friction member 14. Since the vibrator holder 12 and the movable frame 133 displace and absorb the tolerances of the plurality of components in the pressing direction D2, the displacements at that time cause the dampers 19a and 19b to bend and generate the reaction forces. In order to reduce the reaction forces, this embodiment employs an arrangement in which the dampers 19a and 19b are disposed after the vibrator 11 is brought into pressure contact with the friction member 14. That is, the contact areas A1, A2, A3, A4, and A5 are exposed when they are viewed from the pressing direction D2, and the vibrator 11 is brought into pressure contact with the friction member 14 so that the vibrator holder 12 and the movable frame 133 displace in the pressure direction D2 to absorb the tolerances of the components, and then the dampers 19a and 19b are disposed. Thereby, it is possible to reduce the deflections of the dampers 19a and 19b.

This embodiment has described the case where the dampers 19a and 19b contact the vibrator holder 12, the roll member 131 displaceable in the pressing direction D2 relative to the vibrator holder 12, the play removing spring 132, and the movable frame 133. However, as long as a component moves in the driving direction together with the vibrator and can be displaced in the pressing direction D2 relative to the vibrator holder, the damper may contact that component.

Second Embodiment

Figures 6A, 6B:
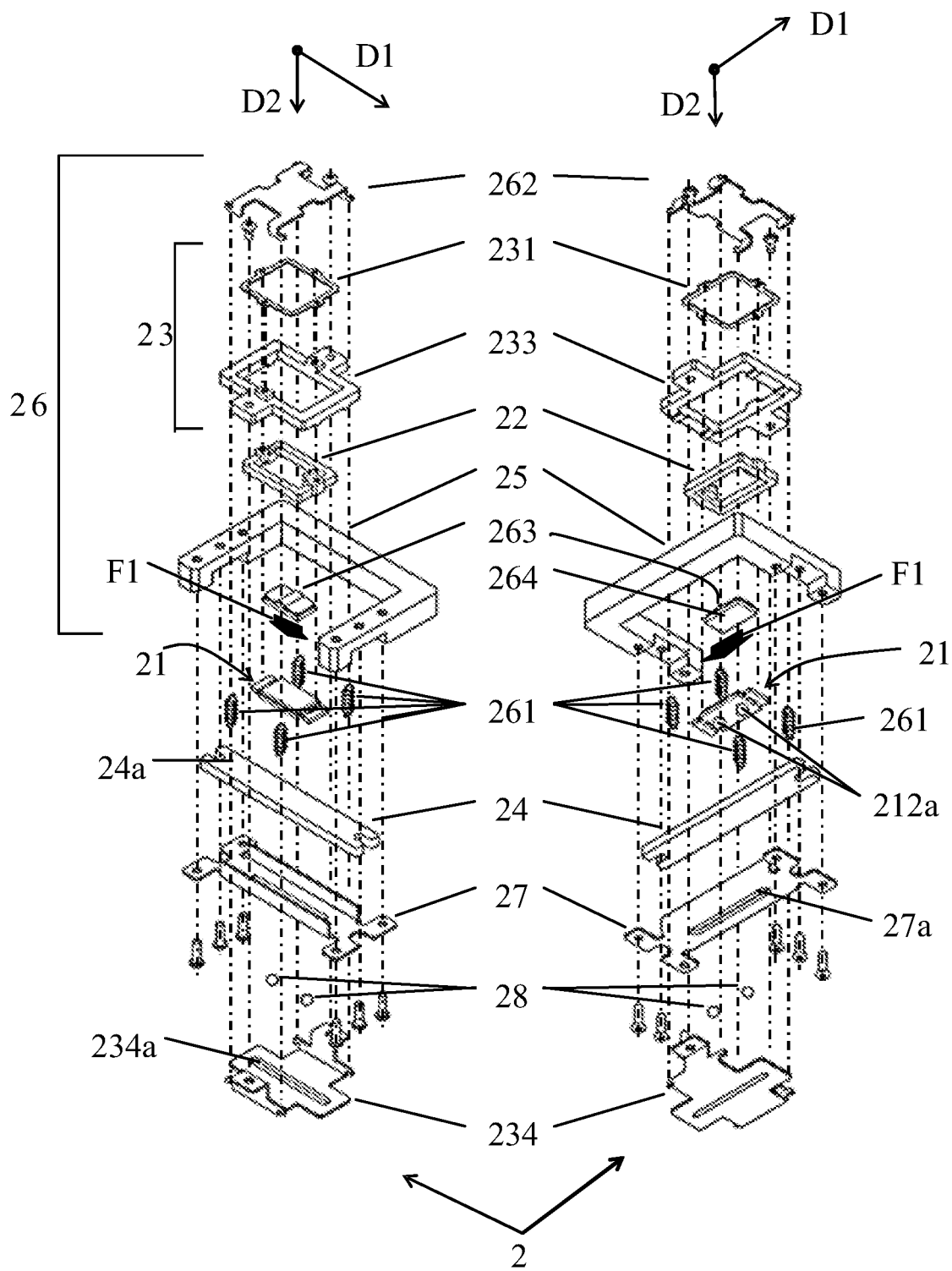
FIGS. 6A and 6B are exploded perspective views of a vibration motor according to a second embodiment of the present invention.

FIGS. 6A and 6B are exploded views of a vibration type motor 2 according to a second embodiment of the present invention. FIG. 6A illustrates the vibration type motor 2 viewed from diagonally above, and FIG. 6B illustrates the vibration type motor 2 viewed from diagonally below. D1 and D2 in FIGS. 6A and 6B are the same as the driving direction D1 and the pressing direction D2 in the first embodiment.

The vibration type motor 2 includes a vibrator 21, a vibrator holder 22, a holding mechanism 23, a friction member 24, a base member 25, and a press mechanism 26, similar to the vibration motor 1 in the first embodiment. The structures of the vibrator 21 and the vibrator holder 22 are the same as those of the vibrator 11 and the vibrator holder 12 of the vibration type motor 1.

The holding mechanism 23 includes a connecting plate 231, a movable frame 233, and a movable guide member 234. The connecting plate 231 is made, for example, of a thin sheet metal, and the movable frame 232 and the movable guide member 234 are the same as the movable frame 133 and the movable guide member 134 in the vibration type motor 1. The movable guide member 234 is movably guided in a driving direction D1 by a fixed guide member 27 and a roll ball 28 (described later).

In the holding mechanism 13 in the vibration type motor 1 according to the first embodiment, the vibrator holder 12 is held between the two roll members 131 in the driving direction D1. On the other hand, in the holding mechanism 23 in the vibration type motor 2 according to this embodiment, the connecting plate 231 is fixed to the vibrator holder 22 and the movable frame 232. Thereby, the holding mechanism 23 holds the vibrator 21 via the vibrator holder 22. The connecting plate 231 is formed of a thin sheet metal and thus is highly rigid in the driving direction D1 and less rigid in the pressing direction D2. Therefore, the vibrator 21 and the vibrator holder 22 are integrally restrained by the movable frame 233 in the driving direction D1 without any play, and displaceably held in the pressing direction D2.

The above holding mechanism 23 enables the driving force generated by the vibrator 21 to be transmitted to the vibrator 21 without any play in the driving direction D1 and without hindering the pressing force F1. Thereby, the contact state between the vibrator 21 and the friction member 24 can be made stable, and a good driving characteristic of the vibration type motor 2 can be obtained.

The friction member 24 and the base member 25 are the same as the friction member 14 and the base member 15 in the vibration type motor 1 according to the first embodiment. The friction member 24 and the fixed guide member 27 are fixed onto the base member 25.

The movable guide member 234 and the fixed guide member 27 have a guide groove 234a and a guide groove 27a, respectively, and two rolling balls 28 are sandwiched between the guide grooves 234a and 27a. This structure enables the movable guide member 234 to be movably guided relative to the fixed guide member 27 in the drive direction D1.

The press mechanism 26 includes a pressing force generator 261, a first press plate 262, a second press plate 263, and a buffer member 264, similar to the press mechanism 16 in the vibration type motor 1. The pressing force generator 261, the first press plate 262, the second press plate 263, and the buffer member 264 are similar to the pressing force generator 161, the first press plate 162, the second press plate 163, and the buffer member 164 in the vibration type motor 1, respectively. Similar to the first embodiment, the press mechanism 26 directly applies the pressing force F1 to the vibrator 21 without intervention of the vibrator holder 22.

In the vibration type motor 2 configured as described above, when elliptical motion occurs at the protrusions 212a of the vibrator 21 similar to the first embodiment, the driving force is generated between the protrusion 212a and the sliding surface 24a of the friction member 24. Thus, the vibrator 21, the vibrator holder 22, the holding mechanism 23, and the press mechanism 26 can be driven in the driving direction D1 relative to the friction member 24 and the base member 25.

Even this embodiment provides, in order to suppress the noises described in the first embodiment, as illustrated in FIGS. 7A to 7C, the dampers 29a and 29b as elastic members that contact various components that move in the driving direction D1 together with the vibrator 21 and are relatively displaceable in the pressing direction D2. Even in this embodiment, the components that move in the driving direction D1 together with the vibrator 21 and are relatively displaceable in the pressing direction D2 include the vibrator holder 22, the connecting plate 231, the movable frame 233, and the movable guide member 234 that constitute the holding mechanism 23, and the pressing force generator 261, the first press plate 262, the second press plate 263, and the buffer member 264 that constitute the press mechanism 26. This embodiment provides the dampers 29a and 29b so that they contact a plurality of components among them, respectively.

FIG. 7A illustrates the vibrator 21, the vibrator holder 22, the holding mechanism 23, the friction member 24, the press mechanism 26, and the dampers 29a and 29b viewed from the top, and FIGS. 7B and 7C illustrate A-A and B-B sections in FIG. 7A.

The dampers 29a and 29b are made of an elastic adhesive, a damping rubber or the like, similar to the dampers 19a and 19b according to the first embodiment. Both the dampers 29a and 29b are arranged across the vibrator holder 22 and the first press plate 262, and contact them in contact areas A6 and A7. The first press plate 262 and the second press plate 263 are held displaceably relative to the vibrator 21 and the vibrator holder 22 in the pressing direction D2 in order to absorb size changes caused by the crushing of the buffer member 264 when the vibrator 21 is pressed by the press mechanism 26.

In this structure, when the resonance occurs between the vibrator 21 and the vibrator holder 22 in the same manner as described with reference to FIGS. 3A and 3B in the first embodiment, a displacement difference occurs between the vibrator holder 22 and the first press plate 262 and as a result, the dampers 29a and 29b bend and attenuate the displacement of the vibrator holder 22 in the pressing direction D2.

As described above, even in the vibration type motor 2 according to this embodiment, the holding mechanism 23 holds the vibrator 21 via the vibrator holder 22, and the press mechanism 26 presses the vibrator 21 against the contact member 24 without intervention of the vibrator holder 22. The holding mechanism 23 holds the vibrator 21 and the vibrator holder 22 integrally so that they are restrained in the driving direction D1 and displaceable in the pressing direction D2. Then, this embodiment attenuates the vibrations in the pressing direction D2 of the vibrator holder 22 and the components that constitute the holding mechanism 23 for holding the vibrator holder 22 by bringing the dampers 29a and 29b into contact with a plurality of components that move in the driving direction D1 together with the vibrator 21 and are relatively displaceable in the pressing direction D2 (the vibrator holder 22 and the first press plate 262 displaceable in the pressing direction D2 relative to the vibrator holder 22).

Similar to the first embodiment, the above structure can suppress the vibrations of the vibrator holder 22 and the like in the pressing direction D2 and the noises caused by the vibrations. In particular, when the resonance frequency between the vibrator 21 and the vibrator holder 22 is in the audible range of 20 kHz or less, the noises caused by the resonance can be effectively suppressed.

Similar to the first embodiment, even in this embodiment, the contact areas A6 and A7 of the dampers 29a and 29b with other components may not overlap each other when viewed from the pressing direction D2 and the contact areas A6 and A7 may have parts that do not overlap each other.

Similar to the first embodiment, even in this embodiment, the dampers 29a and 29b may be disposed after the contact areas A6 and A7 are exposed when viewed from the pressing direction D2, the vibrator 21 is brought into pressure contact with the friction member 24, and the vibrator holder 22 and the movable frame 233 displace in the pressing direction D2 to absorb the tolerances of the components.

This embodiment has described the case where the dampers 29a and 29b are brought into contact with the vibrator holder 12 and the first press plate 262 displaceable in the pressing direction D2 with respect to the vibrator holder 12. However, the damper may be brought into contact with another component as long as the other component moves in the driving direction together with the vibrator and is displaceable in the pressing direction D2 relative to the vibrator holder.

The driving principle in the vibration type motor described in the first and second embodiments, the holding and pressing structures of the vibrator and the friction member, and the material of each member are merely illustrative and other structures and materials, etc., may be adopted.

Third Embodiment

Figure 8A:
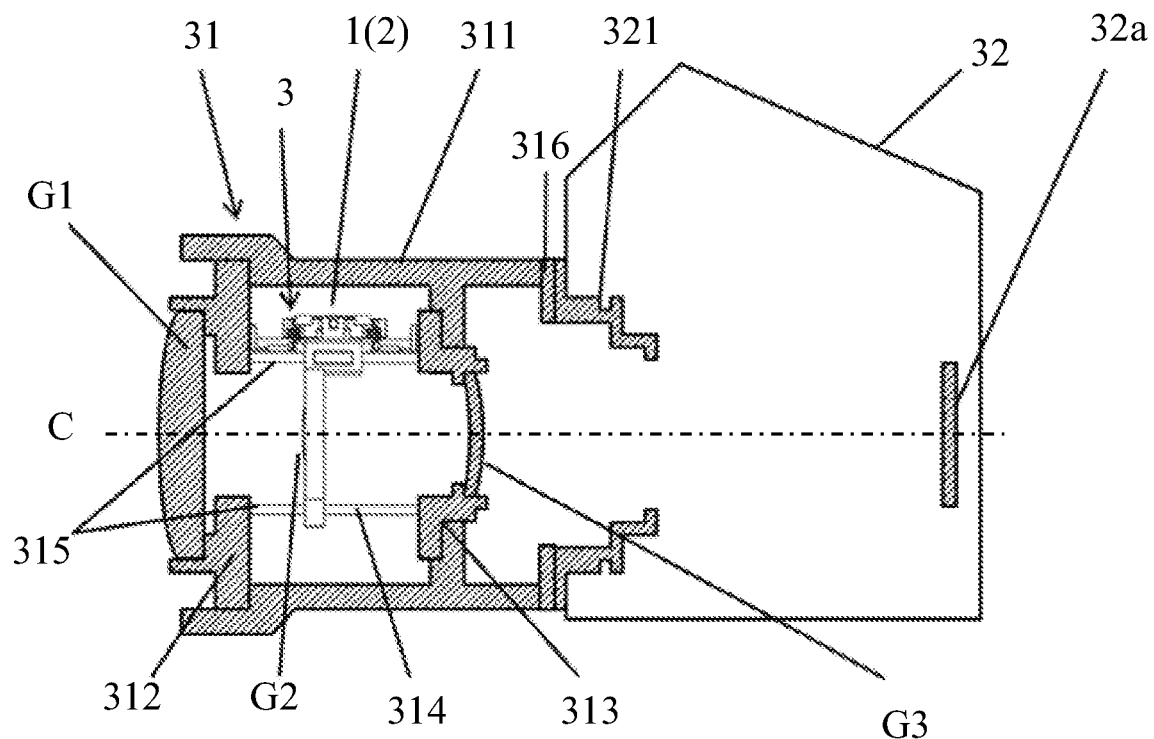
FIGS. 8A and 8B illustrate a structure of a vibration motor according to a third embodiment of the present invention.
Figure 8B:
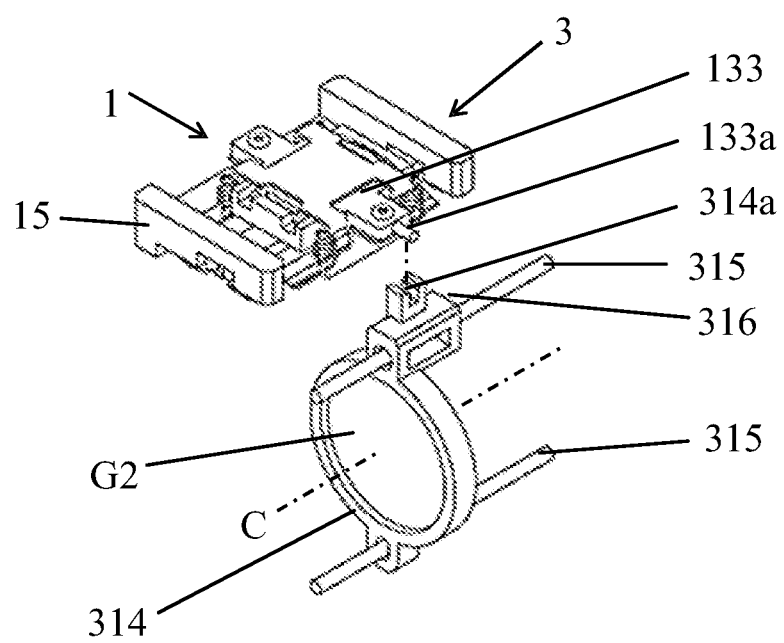

FIG. 8A illustrates a structure of an interchangeable lens 31 as an optical apparatus according to a third embodiment of the present invention and a camera body 32 as an image pickup apparatus to which the interchangeable lens 31 is detachably attached. The interchangeable lens 31 has a lens driving mechanism 3 into which the vibration motor 1 according to the first embodiment (or the vibration motor 2 according to the second embodiment) is incorporated.

The interchangeable lens 31 includes a fixed barrel 311 and a lens mount 316 fixed onto the fixed barrel 311. The lens mount 316 is detachably coupled to a camera mount 321 of the camera body 32 by a bayonet mechanism. The fixed barrel 311 is fixed with a front barrel 312 for holding a lens G1 and a rear barrel 313 for holding a lens G3. A lens holding frame 314 for holding a lens (optical element) G2 is disposed in the fixed barrel 311. The lens holding frame 314 is guided by a guide bar 315 whose both ends are held by the front barrel 312 and the rear barrel 313 movably in a direction (optical axis direction) C in which an optical axis indicated by an alternate long and short dash line in the drawing extends. An image pickup optical system includes the lenses G1 to G3.

The camera body 32 has an image sensor 32a that captures an object image formed by the image pickup optical system.

In the lens driving mechanism 3 that drives the lens holding frame 314 in the optical axis direction within the fixed barrel 311, both ends of the base member 15 in the optical axis direction are fixed onto the front barrel 312 and the rear barrel 313 so that the driving direction of the vibration type motor 1 accords with the optical axis direction C. The movable frame 133 in the vibration type motor 1 includes a driving force transmitter 133a that is engaged with an engagement part 314a provided to the lens holding frame 314 and transmits the driving force of the vibration type motor 1 to the lens holding frame 314.

When the vibration type motor 1 is driven, the driving force is transmitted to the lens holding frame 314 via the movable frame 133 and the driving force transmitter 133a, and the lens holding frame 314 moves in the optical axis direction C while guided by the guide bar 315.

As described in the first embodiment, this embodiment can implement the interchangeable lens 31 having a quiet lens driving sound, by using the vibration type motor 1, in which the noises are suppressed, to drive the lens.

This embodiment has described the case where the lens is driven by the driving force generated by the vibration type motor in the interchangeable lens, but the lens may be driven in the lens integrated type image pickup apparatus (optical apparatus). The embodiment according to the present invention covers not only an optical apparatus but also various driving apparatuses that drive a driven member through the driving force generated by the vibration type motor.

The above embodiments can suppress noises from the vibration type motor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-116405, filed on Jun. 24, 2019, which is hereby incorporated by reference herein in its entirety.

What is claimed is:

1. A vibration type motor configured to relatively move, in a first direction, a vibrator whose vibration is excited by an electromechanical energy conversion element and a contact member configured to contact the vibrator, the vibration type motor comprising:
   a vibrator holder configured to hold the vibrator;
   a holding mechanism configured to hold the vibrator holder so as to restrict a displacement of the vibrator holder in the first direction and to enable the vibrator holder to be displaced in a direction orthogonal to the first direction;
   a press mechanism configured to press the vibrator against the contact member in a second direction; and
   a damper configured to contact a plurality of components among the vibrator holder, components of the holding mechanism, and components of the press mechanism.

2. The vibration type motor according to claim 1, wherein the damper attenuates the vibration in the second direction, which is generated in the vibrator holder and the components when the vibration is excited in the vibrator.

3. The vibration type motor according to claim 1, wherein the damper attenuates a resonance generated between the vibrator and the vibrator holder when the vibration is excited in the vibrator.

4. The vibration type motor according to claim 3, wherein the resonance has a resonance frequency of 20 kHz or less.

5. The vibration type motor according to claim 1, wherein the damper contacts the vibrator holder and the components.

6. The vibration type motor according to claim 1, wherein the components which the damper contacts include a member configured to displace relative to the vibrator holder in the second direction.

7. The vibration type motor according to claim 1, wherein the components which the damper contacts include a member configured to displace relative to the vibrator holder in the second direction and to contact the vibrator holder.

8. The vibration type motor according to claim 1, wherein a plurality of contact areas where the damper and the plurality of components contact each other do not overlap each other when viewed from the second direction.

9. The vibration type motor according to claim 1, wherein a plurality of contact areas where the damper and the plurality of components contact each other includes parts that do not overlap each other when viewed from the second direction.

10. The vibration type motor according to claim 1, wherein the damper is provided so as to contact an exposed area when viewed from the second direction in the plurality of components.

11. An optical apparatus comprising:
    a vibration type motor configured to relatively move, in a first direction, a vibrator whose vibration is excited by an electromechanical energy conversion element and a contact member configured to contact the vibrator; and
    an optical element driven by a driving force generated by the vibration type motor,
    wherein the vibration type motor includes:
    a vibrator holder configured to hold the vibrator;
    a holding mechanism configured to hold the vibrator holder so as to restrict a displacement of the vibrator holder in the first direction and to enable the vibrator holder to be displaced in a direction orthogonal to the first direction;
    a press mechanism configured to press the vibrator against the contact member in a second direction; and
    a damper configured to contact a plurality of components among the vibrator holder, components of the holding mechanism, and components of the press mechanism.

12. A driving apparatus comprising:
    a vibration type motor configured to relatively move, in a first direction, a vibrator whose vibration is excited by an electromechanical energy conversion element and a contact member configured to contact the vibrator; and
    a driven member driven by a driving force generated by the vibration type motor,
    wherein the vibration type motor includes:
    a vibrator holder configured to hold the vibrator;
    a holding mechanism configured to hold the vibrator holder so as to restrict a displacement of the vibrator holder in the first direction and to enable the vibrator holder to be displaced in a direction orthogonal to the first direction;
    a press mechanism configured to press the vibrator against the contact member in a second direction; and
    a damper configured to contact a plurality of components among the vibrator holder, components of the holding mechanism, and components of the press mechanism.

* * * * *